(12) United States Patent
Szczudlo et al.

(10) Patent No.: US 12,495,793 B2
(45) Date of Patent: Dec. 16, 2025

(54) PRESERVATION OF STEM CELLS

(71) Applicant: CARNAMEDICA SP. Z O.O., Warsaw (PL)

(72) Inventors: Pawel Szczudlo, Warsaw (PL); Ilona Kalaszczynska, Warsaw (PL)

(73) Assignee: CARNAMEDICA SP. Z O.O., Warsaw (PL)

( * ) Notice: Subject to any disclaimer, the term of this patent is extended or adjusted under 35 U.S.C. 154(b) by 935 days.

(21) Appl. No.: 17/425,383

(22) PCT Filed: Jan. 23, 2020

(86) PCT No.: PCT/EP2020/051685
§ 371 (c)(1),
(2) Date: Jul. 23, 2021

(87) PCT Pub. No.: WO2020/152297
PCT Pub. Date: Jul. 30, 2020

(65) Prior Publication Data
US 2022/0079140 A1    Mar. 17, 2022

(30) Foreign Application Priority Data
Jan. 23, 2019  (EP) .................................... 19461506

(51) Int. Cl.
*A01N 1/126*     (2025.01)
*A01N 1/125*     (2025.01)
*C12N 5/0775*    (2010.01)

(52) U.S. Cl.
CPC ............. *A01N 1/126* (2025.01); *A01N 1/125* (2025.01); *C12N 5/0667* (2013.01)

(58) Field of Classification Search
CPC .... A01N 1/0226; A01N 1/0221; A01N 1/125; C12N 5/0667
See application file for complete search history.

(56) References Cited

U.S. PATENT DOCUMENTS

| | | | |
|---|---|---|---|
| 6,045,990 A | 4/2000 | Baust | |
| 2009/0017438 A1 | 1/2009 | Roy et al. | |
| 2014/0080111 A1 | 3/2014 | Lopez et al. | |

FOREIGN PATENT DOCUMENTS

| | | |
|---|---|---|
| CN | 102578077 A | 7/2012 |
| CN | 104770363 A | 7/2015 |
| CN | 105145547 A | 12/2015 |
| CN | 105961374 A | 9/2016 |
| CN | 106332869 A | 1/2017 |
| CN | 107912419 A | 4/2018 |
| EP | 2298071 A1 | 3/2011 |
| WO | 2016164693 A1 | 10/2016 |

OTHER PUBLICATIONS

Dutheil, D., et al. "Protective effect of PEG 35 000 Da on renal cells: paradoxical activation of JNK signaling pathway during cold storage." American Journal of Transplantation 6.7 (2006): 1529-1540. (Year: 2006).*
Matsumoto, N., et al. "Successful liquid storage of peripheral blood stem cells at subzero non-freezing temperature." Bone marrow transplantation 30.11 (2002): 777-784. (Year: 2002).*
Berz, David, et al. "Cryopreservation of hematopoietic stem cells." American journal of hematology 82.6 (2007): 463-472. (Year: 2007).*
Hawkins, Brian J., Alireza Abazari, and Aby J. Mathew. "Biopreservation Best Practices for regenerative medicine GMP manufacturing & focus on optimized biopreservation media." Cell Gene Ther Insights 3.5 (2017): 345-358. (Year: 2017).*
Yong-An Lee et al; "Cryopreservation of Mouse Spermatongonial Stem Cells in Dimethylsulfoxide and Polyethylene Glycol"; Biology of Reproduction; Nov. 2013.
N. Matsumoto et al.; "Successful liquid storage of peripheral blood stem cells at subzero non-freezing temperature"; Bone Marrow Transplantation, Nov. 2002.
Hawkins, et al. "Biopreservation Best Practices for regenerative medicine GMP manufacturing focus on optimized biopreservation media"; BioLife Solutions, Inc.; 2017.
Petrenko, et al.; "Clinically Relevant Solution for the Hypothermic Storage and Transportation of Human Multipotent Mesenchymal Stromal Cells"; Institute of Experimental Medicine of the Czech Academy of Sciences; 2018.
Matsumoto, et al., Successful Liquid Storage of peripheral blood stem cells at subzero non-freezing temperature; Bone Marrow Transpl. (2002) 777-784.
Canovas, et al.; "Diversity and versatility of p38 kinase signalling in health and disease"; Nature Reviews; May 2021.
Hawkins, et al.; "Biopreservation Best Practices for regenerative medicine GMP manufacturing & focus on optimized biopreservation media"; Bioinsights; Jun. 2017.
Petrenko, et al; "Clinically Relevant Solution for the Hypothermic Storage and Transportation of Human Multipotent Mesemchymal Stromal Cells"; Stem Cells Internationals; Jan. 20, 2019.

* cited by examiner

*Primary Examiner* — Maria G Leavitt
*Assistant Examiner* — Michael Angelo Riga
(74) *Attorney, Agent, or Firm* — Dickinson Wright PLLC; Andrew D. Dorisio; Nicholas P. Coleman

(57) ABSTRACT

The invention relates to a field of stem cell preservation and in particular to use of an aqueous solution comprising polyethylene glycol (PEG) having a molecular weight about 35000 Da as an extracellular agent for preserving stem cells.

15 Claims, 4 Drawing Sheets

PRESERVATION OF STEM CELLS

CROSS-REFERENCE TO RELATED APPLICATIONS

This Application is a National Stage Entry application from PCT App. No. PCT/EP2020/051685, filed on Jan. 23, 2020, titled, "PRESERVATION OF STEM CELLS", which claims benefit and priority to EP Application Serial No. 19461506.8, filed on Jan. 23, 2019, the disclosures of said applications hereby incorporated herein by reference in their entirety.

FIELD OF INVENTION

The subject invention relates to a field of stem cell preservation and in particular to use of an aqueous solution comprising polyethylene glycol (PEG) having a molecular weight about 35000 Da as an extracellular agent for preserving stem cells.

PRIOR ART

Stem cells are widely used in scientific research and in clinical therapies because of their potential for self-renewal and multidirectional differentiation. Stem cells have many functions and applications—for example, they can be used in research relating to the growth of tissues and organs in vitro, for the development of disease models, for screening, as well as in methods of treatment. For example, mesenchymal stem cells can be used in treatment of diabetes, liver cirrhosis, skin damage, and myocardial infarction. In addition, they can strengthen the hematopoiesis, regulate the immune response.

Therapies based on stem cells are increasingly advancing through preclinical and clinical trials. Improved carrier solutions used for the preservation and delivery of cells will allow for a worldwide extension of the possibility of application of stem cell-based advanced therapies. Furthermore, an increase of cells stability, understood as maintained viability and functionality, will provide the flexibility and extension of the scope of stem cells application. The quality of cells changes in time and due to the influence of a variety of external factors, such as compositions of carrier solutions, or temperature conditions during transportation. However, application of stem cells in all the indicated applications requires the development of effective methods of their preservation, ensuring not only the maintenance of high cell viability, but also protection against contamination by bacteria and pathogens, as well as reasonable costs of culturing the cells.

Preservation of organs, tissues and cells in a cold storage (i.e. in hypothermic conditions) means using the temperature ranging from 0 to 5° C., for example temperature of about 4° C. So called hypothermic solutions are used for that purpose. Cells immersed in such solutions in temperature of 4° C. remain in a state called sustained hypothermia. Many solutions used for that purpose is known in the prior art, for example VIASPAN® also called University of Wisconsin solution or UW solution, or EURO-COLLINS.

However, only short term storage is possible in such conditions. In case of long term storage, it is necessary to freeze the preserved materials in temperature range between their freezing temperature and temperature of liquid nitrogen (−196° C.). This process is also called cryopreservation.

Many technical solutions relating to the optimization of preservation process of the organs, tissues and cells, both in reference to the coldstorage as well as to cryopreservation, exists in the prior art.

In order to ensure the efficient transplantation, the stem cells have to be preserved in such a manner to maintain their viability. For example, in case of cryopreservation much effort was put in order to eliminate the cell death caused by freezing mainly due to the intracellular ice formation and chemo-osmotic stress. Cryoprotectants, for examples dimethyl sulfoxide (DMSO), are used for that purpose.

Document U.S. Pat. No. 6,045,990 describes a cell-free solution for hypothermic storage of human or animal organs, tissues and cells. The solutions comprises at least one electrolyte selected from the group including potassium ions, sodium ions, magnesium ions and calcium ions; a macromolecular oncotic agent; a biological buffer; a nutritive effective amount of at least one simple sugar; mannitiol, an impermeant anion impermeable to cell membranes; a substrate effective for the regeneration of ATP; and glutathione.

Publication by N. Matsumoto et al., 'Successful liquid storage of peripheral blood stem cells at subzero non-freezing temperature' Bone Marrow Transpl., (2002), 30, 777-784, describes experiments for several solutions during the stem cells preservation in temperatures below zero, but without freezing. (i) Mixture of plasma, ACD-A solution and heparin; (ii) Belzer UW solution—intracellular formulation comprising heparin, potassium lactobionate, $KH_2PO_4$, raffinose, adenosine, glutathione, allopurinol, hydroxyethyl starch and NaOH, as well as both of those mentioned formulations mixed with albumin, were tested.

The application CN105145547 describes a fluid for stem cells cryopreservation comprising DMSO, umbilical cord mesenchymal stem cell conditional medium and fetal calf serum.

CN 104770363 discloses a plasma-free solution for stem cells cryopreservation comprising DMSO and dextrane-40.

Document CN105961374 discloses a cell cryopreservation fluid used inter alia for cryopreservation of stem cells, comprising: PBS or normal saline; a basal culture medium as a main ingredient, as well as one or more constituents selected from polyethylene glycol, propanediol, Ectoin, albumin, trehalose, proline and poloxamer 188. The mentioned fluid for cell cryopreservation does not contain serum and DMSO. According to the contents of the patent description, the polyethylene glycol is added in order to lower the freezing temperature and to increase the dehydration of cells. Document neither discloses the molecular weight of the polyethylene glycol used, nor defines whether the fluid is of intracellular or extracellular type.

The application CN107912419 describes a liquid for cryopreservation of human peripheral blood mononuclear cells, including stem cells, comprising: dimethyl sulfoxide, polyethylene glycol, human serum albumin, Plasmalyte-A, trehalose, hydroxyethyl starch, beta-glucan, glucose and vitamin C. The document does not disclose the molecular mass of polyethylene glycol. The polyethylene glycol is used inter alia due to its good solubility in water and low melting temperature, so as a result the extracellular solution does not form ice crystals during the cooling process.

CN102578077 discloses a serum-free cryoprotective agent which comprises an intracellular permeation protecting agent(DMSO) and an extracellular protecting agent comprising NaCl, KCl, $Na_2HPO_4$, $KH_2PO_4$, PEG having a molecular mass in the range of 400 to 2000 Da, D-trehalose and type-IV collagen. The disclosed agent can be used for stem cells storage.

The solution described herein in Example 1, being a preferred embodiment of the subject invention, is known as a formulation used for perfusion and cold storage of organs for transplantation. This formulation is being introduced into the market by the Applicant of the present invention under the tradename StoreProtect Plus.

Although great progress has been made in the subject field, there are still many problems associated, in particular, with cryopreservation, i.e. storing cells in a frozen state. The main disadvantage of the known solutions and media is that the viability of the cells decreases in time (both in hypothermic conditions and during cryopreservation), also during transportation between laboratory and the recipient's location.

In the view of the prior art described above, there is an unmet need for providing an agent which could be used effectively to preserve stem cells, also in the conditions typical for cryopreservation.

Surprisingly, it turned out that the aqueous solution comprising polyethylene glycol (PEG) having a molecular weight of about 35000 Da can be successfully used as an extracellular agent for preserving stem cells, and after addition of dimethyl sulfoxide (DMSO), also as agent for cryopreservation of stem cells.

SUBJECT OF THE INVENTION

The subject of the invention is the use as defined in claim 1. The preferred embodiments of the invention are defined in dependent claims 2-11.

Advantages of the Invention

According to the tests conducted by the present inventors, the use of the subject invention allows for effective preservation of collected stem cells. The viability of the stem cells preserved according to the invention exceeds the results obtained for typical, commercially available storage formulations.

Additionally, the mentioned experiments proved that after addition of dimethyl sulfoxide (DMSO), the use according to the invention allows also for effective cryopreservation of stem cells. Also in this case, the obtained results were at least comparable to the results obtained for typical, commercially available formulations, and they were even exceeding them.

Therefore, the use according to the invention allows for using broader temperature ranges during cell transportation, making the cells more resistant to prolonged transportation times and varying temperature conditions. Thus, the quality of the cells preserved according to the invention is also improved.

DETAILED DESCRIPTION OF THE INVENTION

Figure 1:
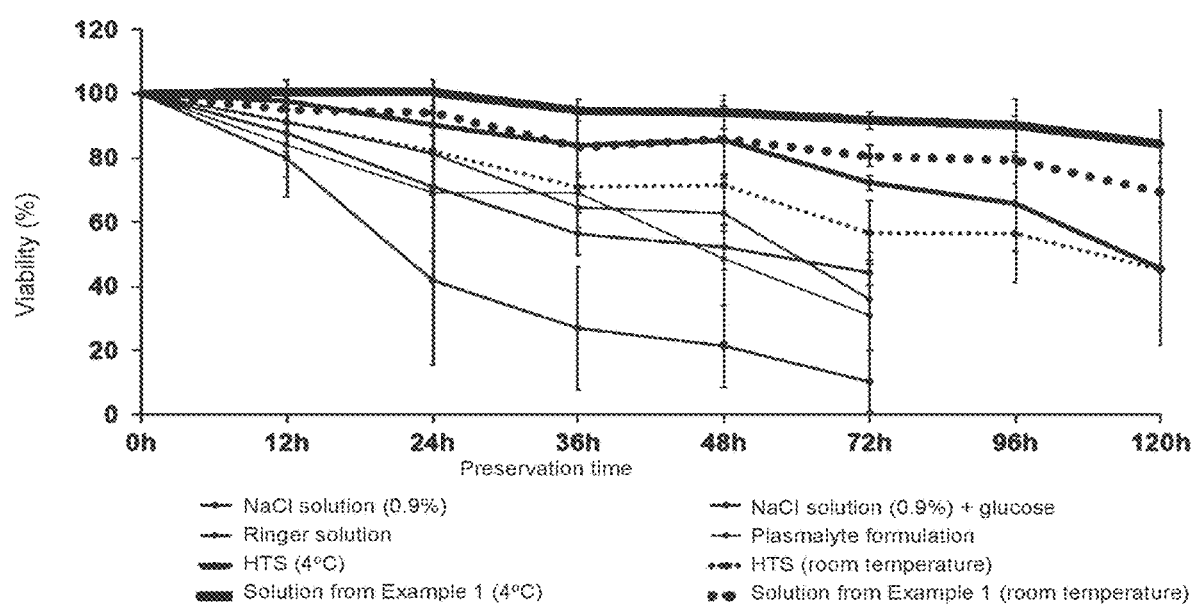
FIG. 1 shows the results of ADSC cells viability measurements after 12, 24, 36, 48, 72, 96 and 120 hours of storage in various tested formulations.

The subject invention has been developed based on the observation made by its inventors that the aqueous solution comprising polyethylene glycol (PEG) having a defined molecular weight allows for effective preservation of stem cells while maintaining their viability.

In the use according to the subject invention PEG having molecular weight of about 35000 Da (35 kDA) also called PEG 35, is employed. PEG used according to the present invention can be obtained by any known method, wherein preferably it can be synthetized from PEG molecules having lower molecular weight. In other preferred embodiment of the invention, PEG may be purified by any known technique known in the prior art. In especially preferred embodiment of the invention commercially available PEG can be used.

According to the invention, PEG is preferably used at a concentration from about 0.01 to about 5 mmol/l, for example at a concentration of 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.5, 2.0, 2.5, 3.0, 3.5, 4.0, 4,5 and 5 mmol/l. In a particularly preferred embodiment of the invention, the PEG concentration is lower than 1 mmol/l and most preferably it is about 0.03 mmol/l.

According to the subject invention, the employed aqueous solution is used as extracellular agent, i.e. agent, in which the sodium ions ($Na^+$) is greater than the concentration of potassium ions ($K^+$). Agents of this type prevent the cell death during storage by reducing ice formation inside a cell.

In a preferred embodiment of the invention, the solution contains $Na^+$ ions at a concentration of at least about 30 mmol/l and $K^+$ ions at a concentration of at least about 10 mmol/l. In the most preferred embodiment of the invention the solution contains $Na^+$ ions at a concentration of about 125 mmol/l and $K^+$ ions at a concentration of about 25 mmol/l.

Preferably, sodium ions are introduced in sodium hydroxide (NaOH), while potassium ions are introduced in potassium dihydrogen phosphate ($KH_2PO_4$).

In a particularly preferred embodiment of the invention, besides the components mentioned above, i.e. PEG, sodium ions and potassium ions, the solution may contain other components used in the field of cell storageformulations, i.e. an agent comprising an impermeant anion, a compound from the group of sugars, a membrane stabilizing agent, a buffer solution and an energy source.

In an especially preferred embodiment of the invention, the mentioned solution comprises:

| | |
|---|---|
| about 20 to about 40 mmol/l | of raffinose, |
| about 70 to about 140 mmol/l | of lactobionic acid, |
| about 1 to about 10 mmol/l | of $MgSO_4$ |
| about 10 to about 40 mmol/l | of $KH_2PO_4$, |
| about 1 to about 6 mmol/l | of glutathione |
| about 1 to about 10 mmol/l | of adenosine, |
| about 1 to about 5 mmol/l | of allopurinol, |
| about 30 to about 150 mmol/l | of NaOH | wherein pH of the solution is in the range of about 6, 5 to about 8, and osmolality of the solution is in the range of about 290 to about 320 mOsm/kg.

The anion impermeable to cell membranes, whose role is to prevent the cell swelling caused by hypothermia, is lactobionic acid or its salts.

The function of raffinose is additional osmotic support. In a preferred embodiment of the invention raffinose pentahydrate (raffinose·5H$_2$O) is used.

The membrane stabilizing agent is magnesium sulphate, preferably magnesium sulphate heptahydrate (MgSO$_4$·7H$_2$O), which acts in order to stabilize the electrochemical equilibrium of the cell membrane, which determines the proper transport of Na$^+$ ions, K$^+$ ions, phosphorous ions and Ca$^{2+}$ ions.

KH$_2$PO$_4$ is a buffer system, whose role is to maintain pH of the solution, which provides the acid/base equilibrium. Additionally, it provides the potassium ions to the solution.

Glutathione and allopurinol are agents counteracting the formation and action of free radicals.

Adenosine is a source of ATP precursors, being the energy source.

Water used to prepare the solution used according to the invention is a pharmaceutically acceptable water for injections.

In the most preferred embodiment of the invention, mentioned solution comprises:

| | |
|---|---|
| 30 mmol/l | of raffinose•5H$_2$O, |
| 100 mmol/l | of lactobionic acid, |
| 5 mmol/l | of MgSO$_4$•7H$_2$O, |
| 25 mmol/l | of KH$_2$PO$_4$, |
| 3 mmol/l | of glutathione |
| 5 mmol/l | of adenosine, |
| 1 mmol/l | of allopurinol, |
| 0.03 mmol/l | of polyethylene glycol having molecular weight of about 35000 Da | and

NaOH in an amount sufficient to obtain pH of about 7.4, and water for injections, wherein the solution has osmolality of 300 mOsm/kg and comprises about 125 mmol/l of Na$^+$ ions.

When the use according to the subject invention is intended for cryopreservation, an addition of cryoprotectant is necessary. The cryoprotectant may be any component of this type used in the cryopreservation formulations, wherein preferably it is dimethyl sulfoxide (DMSO). Preferably dimethyl sulfoxide (DMSO) is used at a concentration of about 5 to about 20 vol. %, most preferably at a concentration of about 10 vol. % based on total volume of the solution.

The solution used according to the invention does not contain calcium ions added separately or as components of the compounds included in the composition of the mentioned solution. The water for injections used for the preparation of the solution used according to the invention also does not contains said ions.

According to the invention, the term "about" used hereinabove and hereinbelow is to be understood as +/−5% deviation from the given value, reflecting the inaccuracies which may appear during the process of manufacturing of the composition of the invention, e.g. during measurements of the components of the solution.

EXAMPLES

Example 1

Solution for the Preservation of Stem Cells

In experiments relating to the preservation of stem cells, the formulation StoreProtect Plus (Manufacturer: Carnamedica) having following composition, was used:

| | | |
|---|---|---|
| 30 mmol/l | (17.84 g/l) | of raffinose•5H$_2$O, |
| 100 mmol/l | (35.8 g/l) | of lactobionic acid, |
| 5 mmol/l | (1.232 g/l) | of MgSO$_4$•7H$_2$O, |
| 25 mmol/l | (3.402 g/l) | of KH$_2$PO$_4$, |
| 3 mmol/l | (0.922 g/l) | of glutathione |
| 5 mmol/l | (1.336 g/l) | of adenosine, |
| 1 mmol/l | (0.136 g/l) | of allopurinol, |
| 0.03 mmol/l | (1 g/l) | of polyethylene glycol having molecular weight of about 35000 Da | and

NaOH in an amount sufficient to obtain pH of about 7.4, water for injections,

The solution of Example 1 exhibits osmolality of about 300 mOsm/kg and comprises sodium ions (Na$^+$) at concentration of about 120 mmol/l and potassium ions (K+) at concentration of about 25 mmol/l.

Example 2

Solution for Cryopreservation of Stem Cells

In experiments related to cryopreservation of stem cells a formulation from Example 1 additionally comprising 10 vol. % of dimethyl sulfoxide (DMSO) in relation to the total volume of the solution, was used.

Example 3

Short-Term Preservation of Stem Cells

Mesenchymal, adipose-derived Stem Cells (ADSCs) isolated from 9 donors were divided into test groups and stored for up to 120 h. Following experimental groups were used: (a) NaCl solution (0.9%), (b) NaCl solution (0.9%) with glucose, (c) Ringer's solution (Fresenius Kabi), (d) Plasmalyte formulation (Baxter) (comprising, per 1000 ml of the solution: 5.26 g of sodium chloride, 0.37 g of potassium chloride, 0.3 g of magnesium chloride (6H$_2$O), 3.68 g of sodium acetate (3H$_2$O), 5.02 g of sodium gluconate, and comprising: 140 mmol/l of sodium ions, 5 mmol/l of potassium ions, 1.5 mmol/l of magnesium ions, 98 mmol/l of chloride ions, 27 mmol/l of acetate ions (CH$_3$COO$^-$), 23 mmol/l of gluconate ions (C$_6$H$_{11}$O$_7^-$), wherein the theoretical osmolarity of the solution is 294 mOsm/l, pH is about 7.4 (from 6.5-8.0), (e) HypoThermosol FRS formulation (HTS, BioLife Solutions) (comprising/: Trolox, Na$^+$, K$^+$, Ca$^{2+}$, Mg$^{2+}$, Cl$^-$, H$_2$PO$_4^-$ HEPES, lactobionate, sucrose, mannitol, glucose, dextran-40, adenosine, glutathione) and (e) the solution as defined in Example 1. The short term preservation (maximum 120 hours) was conducted in temperature of 4° C., wherein in case of groups (d) and (e) also in room temperature. During the experiment the viability of the cells and number of viable cells were observed in selected time points.

For the purposes of counting, the cells were labeled with propidium iodide and counted with an automatic cell counter (NanoEntec).

Figure 2:
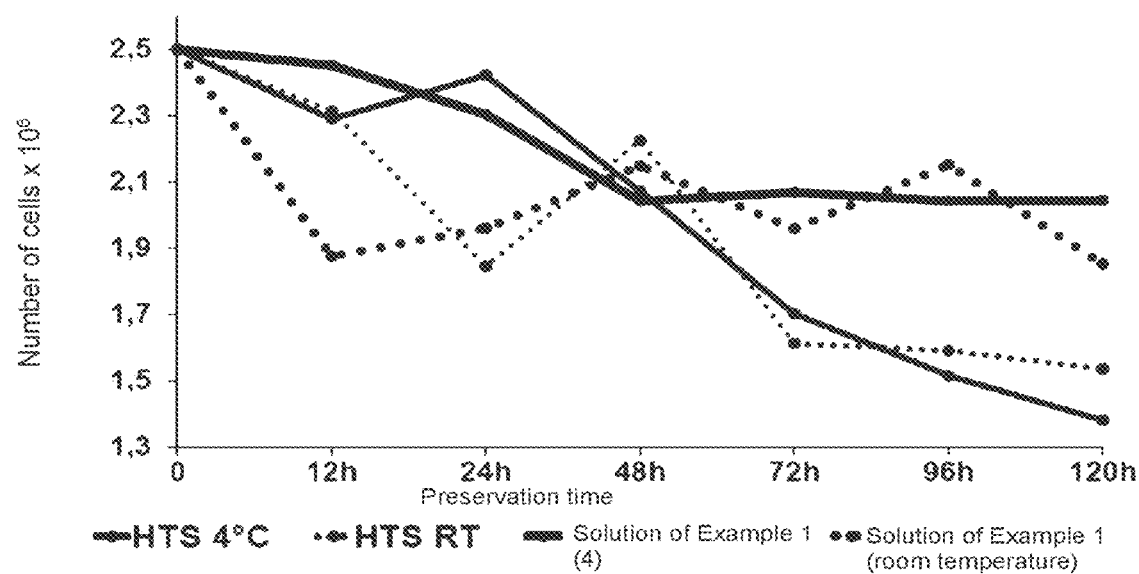
FIG. 2 shows the number of the viable ADSC cells after 12, 24, 36, 48, 72, 96 and 120 hours of storage in HTS formulation and the solution used according to the present invention.

FIG. 1 shows the results of viability measurements obtained for experimental groups (a), (b), (d) and (e), while FIG. 2 shows the number of viable cells as a function of the preservation time for test groups (d) and (e).

The results shown on FIG. 1 confirm that the highest stem cells viability was obtained in case of solution of the solution of Example 1 (above 90% after 120 hours). The number of viable cells after 120 hours from the beginning of the experiment was also the highest in case of solution of Example 1 (FIG. 2).

Example 4

Cryopreservation of Stem Cells

In the second experiment the usability of the formulation as defined in Example 2 in stem cell cryopreservation was tested. In this experiment the same type of stem cells was used as in Example 1. Certified formulation Stem-Cell Banker (Zenoaq) was used as the reference formulation. The experiment has been conducted in temperature of −196° C. for 7 days After thawing the cells, the viability measurement was conducted (in the same manner as in Example 1) and the cells were transferred to the storage solutions (HypoThermosol FRS (HTS, BioLife Solutions) (reference formulation) and the solution of Example 1) in order to assess whether the change of storage conditions negatively influences the cells viability.

During said preservation, cells viability was observed in selected time points (12 hours, 24 hours, 48 hours, 72 hours).

Figure 3:
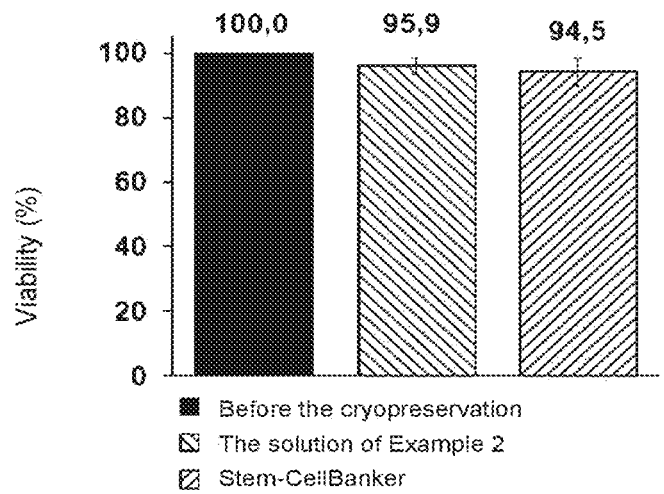
FIG. 3 shows the results of ADSC cells viability measurements before and after cryopreservation.

FIG. 3 shows the results of stem cells viability measurements after cryopreservation. The measurements confirmed that the formulation of Example 2 provides efficient preservation of stem cells in the frozen state.

Figure 4:
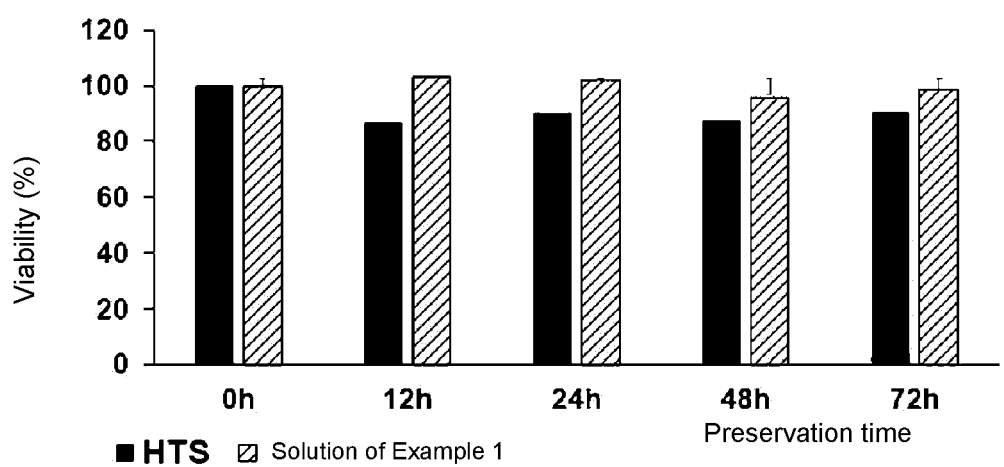
FIG. 4 shows the results of ADSC cells viability measurements after thawing and after 12, 24, 36, 48 and 72 of storage in HTS formulation and the solution used according to the present invention.

FIG. 4 shows the results of stem cells viability measurements after thawing in selected time points for HypoThermosol FRS formulation and the solution of Example 1. The results presented on FIG. 4 clearly show that the solution of Example 1 exhibits better properties than the reference formulation used.

The invention claimed is:

1. A method of preserving stem cells and preventing their degradation, comprising: applying to the stem cells an extracellular agent comprising an aqueous solution comprising polyethylene glycol (PEG) having molecular weight of about 35000 Da,
wherein the solution comprises:
about 20 to about 40 mmol/l of raffinose,
about 70 to about 140 mmol/l of lactobionic acid,
about 1 to about 10 mmol/l of MgSO4,
about 10 to about 40 mmol/l of KH2PO4,
about 1 to about 6 mmol/l of glutathione,
about 1 to about 10 mmol/l of adenosine,
about 1 to about 5 mmol/l of allopurinol,
about 30 to about 150 mmol/l of NaOH,
and additionally
pH of the solution is in the range of about 6.5 to about 8, and
osmolality of the solution is in the range of about 290 to about 320 mOsm/kg,
wherein the aqueous solution of the extracellular agent results in a concentration of sodium ions Na+ that is greater than a concentration of potassium ions K+, thereby preventing cell death during storage by reducing ice formation inside a cell.

2. The method according to claim 1, wherein PEG is present in the solution at a concentration of about 0.01 to about 5 mmol/l.

3. The method according to claim 1, wherein PEG is present in the solution at a concentration lower than about 1 mmol/l.

4. The method according to claim 1, wherein PEG is present in the solution at a concentration of about 0.03 mmol/l.

5. The method according to claim 1, wherein the solution comprises Na+ ions at a concentration of at least 30 mmol/l and K+ ions at a concentration of at least about 10 mmol/l.

6. The method according to claim 1, wherein the solution comprises Na+ ions at a concentration of about 125 mmol/l and K+ ions at a concentration of about 25 mmol/l.

7. The method according to claim 1, wherein the solution comprises
30 mmol/l of raffinose·5H2O,
100 mmol/l of lactobionic acid,
5 mmol/l of MgSO4·7H2O,
25 mmol/l of KH2PO4,
3 mmol/l of glutathione,
5 mmol/l of adenosine,
1 mmol/l of allopurinol,
0.03 mmol/l of polyethylene glycol having molecular weight of about 35000 Da and
NaOH in an amount sufficient to obtain pH of about 7.4, and
water for injections,
wherein the solution has osmolality of 300 mOsm/kg and comprises about 125 mmol/l of Na+ ions.

8. The method according to claim 1, wherein the extracellular agent for preserving stem cells is used for cryopreservation of stem cells, and wherein the solution further comprises dimethyl sulfoxide (DMSO).

9. The method according to claim 8, wherein the solution comprises dimethyl sulfoxide (DMSO) at a concentration of about 5 to about 20 vol. % in relation to the total volume of the solution.

10. The method according to claim 9, wherein the solution comprises DMSO at a concentration of about 10 vol. % in relation to the total volume of the solution.

11. The method according to claim 8, wherein the stem cells are stored in the extracellular agent in a temperature range between −196° C. and the freezing temperature of the stem cells, and wherein the viability of the stem cells after storing is of at least 95% relative to the initial viability of the stem cells.

12. The method according to claim 11, wherein the viability of the stem cells after storing is of at least 95.9% relative to the initial viability of the stem cells.

13. The method according to claim 8, wherein the stem cells are stored in a temperature of −196° C.

14. The method according to claim 1, wherein the stem cells are stored in the extracellular agent in a temperature range from 4° C. to room temperature, and wherein a viability of the stem cells after storing is of at least 70% relative to the initial viability of the stem cells.

15. The method according to claim 1, wherein the stem cells are stored in the extracellular agent in a temperature range from 0 to 5° C., and wherein a viability of the stem cells after storing is of at least 90% relative to the initial viability of the stem cells, and wherein the solution further comprises dimethyl sulfoxide (DMSO).

* * * * *